(12) United States Patent
Chu et al.

(10) Patent No.: US 7,436,519 B2
(45) Date of Patent: Oct. 14, 2008

(54) SYSTEM AND METHOD FOR INTERFEROMETER NON-LINEARITY COMPENSATION

(75) Inventors: David C. Chu, Loveland, CO (US); Lee C. Kalem, Loveland, CO (US); William Clay Schluchter, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 218 days.

(21) Appl. No.: 11/142,423

(22) Filed: Jun. 1, 2005

(65) Prior Publication Data
US 2006/0274322 A1    Dec. 7, 2006

(51) Int. Cl.
*G01B 11/02* (2006.01)
(52) U.S. Cl. .................. 356/486; 356/498
(58) Field of Classification Search .......... 356/486, 356/487, 493, 496, 498, 500
See application file for complete search history.

(56) References Cited

U.S. PATENT DOCUMENTS

| | | |
|---|---|---|
| 5,166,959 A | 11/1992 | Chu et al. |
| 5,331,400 A | 7/1994 | Wilkening et al. |
| 5,663,666 A | 9/1997 | Chu et al. |
| 6,480,126 B1 | 11/2002 | Chu |
| 6,738,143 B2 | 5/2004 | Chu |
| 2002/0089671 A1* | 7/2002 | Hill ............................ 356/486 |
| 2003/0098981 A1* | 5/2003 | Chu ............................ 356/496 |

OTHER PUBLICATIONS

D. Chu article entitled "Phase Digitizing Sharpens Timing Measurements"; IEEE Spectrum, pp. 28-32; Jul. 1988.
F. Demarest article entitled "High-Resolution, High-Speed, Low Data Age Uncertainty, Heterodyne Displacement Measuring Interferometer Electronics"; Meas. Sci. Technol., pp. 1024-1030; 1998.
T, Eom, et al., article entitled "Single Frequency Laser Interferometer with Subnonometer Accuracy"; Proc. of 2nd Euspen International Conference, Turin, Italy; pp. 270-273; May 27-May 31, 2001.

* cited by examiner

*Primary Examiner*—Patrick J Connolly

(57) ABSTRACT

A method for non-linearity compensating interferometer position data generated from a measurement signal includes generating a first set of non-linearity parameters based on received digital position values. The method includes sensing whether a low velocity condition exists. A first one of the non-linearity parameters is updated based on an estimated magnitude of the measurement signal if the low velocity condition exists. At least one digital position value is compensated based on the updated non-linearity parameter if the low velocity condition exists.

29 Claims, 7 Drawing Sheets

SYSTEM AND METHOD FOR INTERFEROMETER NON-LINEARITY COMPENSATION

REFERENCE TO RELATED PATENTS

This application is related to U.S. Pat. No. 6,480,126 B1, filed Oct. 26, 2001, issued Nov. 12, 2002, entitled PHASE DIGITIZER, and U.S. Pat. No. 6,738,143 B2, filed Nov. 13, 2001, issued May 18, 2004, and entitled SYSTEM AND METHOD FOR INTERFEROMETER NON-LINEARITY COMPENSATION, which are both hereby incorporated by reference herein.

BACKGROUND

Light leakage between beams in an interferometer in metrology produces measurement results that depart periodically from the ideal—known as non-linearity.

Previously proposed non-linearity correction techniques are generally costly, and use extra hardware, such as additional beam splitters and detectors. One prior art technique for compensating for non-linearity in a homodyne interferometer involves balancing the two in-phase and quadrature signals within the interferometer for offset, gain and orthogonality. The signals are digitized, computed for imbalance, and analog electronics are used to inject offset and gain compensations. The compensation components are all contained within the interferometer itself. In a heterodyne interferometer, there are no in-phase and quadrature signals to balance. Thus, such a compensation method is not applicable to a heterodyne interferometer.

SUMMARY

Disclosed herein is a method for non-linearity compensating interferometer position data generated from a measurement signal. A first set of non-linearity parameters are generated based on received digital position values. The method includes sensing whether a low velocity condition exists. A first one of the non-linearity parameters is updated based on an estimated magnitude of the measurement signal if the low velocity condition exists. At least one digital position value is compensated based on the updated non-linearity parameter if the low velocity condition exists.

DETAILED DESCRIPTION

In the following Detailed Description, reference is made to the accompanying drawings, which form a part hereof, and in which is shown specific and illustrative embodiments according to the present teachings. It is to be understood that other embodiments may be utilized and structural or logical changes may be made without departing from the scope of the appended claims. The following Detailed Description, therefore, is not to be taken in a limiting sense, and the scope of the present invention is defined by the appended claims.

I. Displacement Measuring Interferometry System

The non-linearity compensation system and method in a specific embodiment according to the present teachings is discussed in the context of a heterodyne displacement measuring interferometry system. However, the compensation techniques disclosed herein are also applicable to a homodyne interferometry system.

A typical displacement measuring interferometer system consists of a frequency-stabilized laser light source, interferometer optics and measuring electronics. In metrology based on homodyne interferometry, the phase progression function $\phi(t)$ is directly proportional to the object displacement in time, t, usually by the factor $\lambda/4$. That is, one unit interval (UI) change represents an object movement of one-quarter of the wavelength of the light wave. One UI represents one light wave interference fringe, or $2\pi$ radians. In mixing, phase is preserved, and a travel of $\lambda/4$ is manifested as one interference fringe. In metrology based on heterodyne interferometry, there are two channels: one Doppler-shifted (Measurement Channel), and the other not shifted (Reference Channel). The difference between the two phase progression functions $\phi_M(t)$ and $\phi_R(t)$ of the two channels is proportional to the object displacement to within an arbitrary constant. The phase-progression functions for both channels are monotonically increasing with time.

Figure 1:
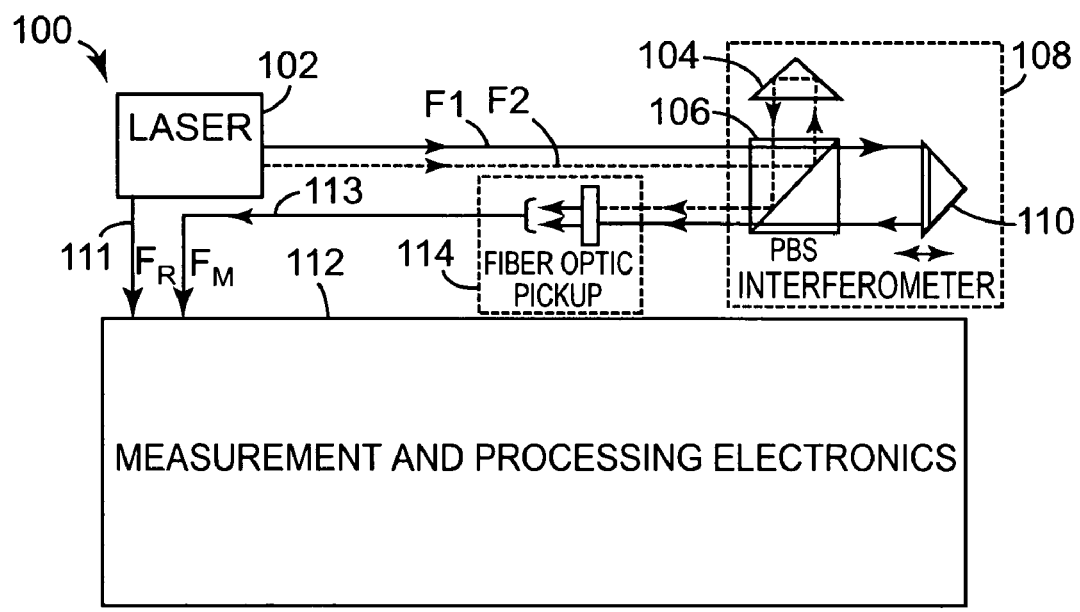
FIG. 1 is a block diagram illustrating a prior art heterodyne displacement measuring interferometer system.

FIG. 1 is a block diagram illustrating a prior art heterodyne displacement measuring interferometer system 100. Interferometer system 100 includes laser 102, interferometer 108, measurement and processing electronics 112, and fiber optic pickup 114. Interferometer 108 includes stationary retroreflector 104, polarizing beam splitter (PBS) 106, and movable retroreflector 110.

Laser 102 generates a pair of collinear, orthogonally-polarized optical beams of equal intensity and of different frequencies $F_1$ and $F_2$, which differ in frequency by $F_R$, which is a reference frequency (also referred to as a split frequency). The optical beams pass through interferometer 108. Polarization beam splitter 106 reflects one polarization of the incoming light to stationary retroreflector 104, and passes the other polarization of light to movable retroreflector 110. The retroreflectors 104 and 110 return the light to the polarization beam splitter 106, where one beam is transmitted and the other beam is reflected, so that the two beams are again collinear. Linear motion of the movable retroreflector 110 results in a corresponding change in the difference in phase between the two beams. The output beams from interferometer 108 go to fiber optic pick-up 114. In fiber optic pick-up 114, the output beams from interferometer 108 are mixed, and the mixed beam is coupled to an optical fiber 113. The mixed beam is referred to as the measurement signal, and the mixing is represented by the following Equation I:

$$\text{Measurement signal} = \vec{F}_1 \otimes F_2 \qquad \text{Equation I}$$

where:

$\otimes$ indicates a mixing operation; and the overhead line on $F_1$ indicates that the signal is Doppler-shifted.

Measurement and processing electronics 112 contain a fiber optic receiver that produces an electrical measurement signal corresponding to the optical measurement signal. The measurement signal has a frequency that is equal to the reference frequency, $F_R$, plus the Doppler shift frequency, as shown in the following Equation II:

$$F_M = F_R + nv/\lambda \qquad \text{Equation II}$$

where:

v is the velocity of the interferometer element whose position is being measured (the sign of v indicates the direction of travel);

$\lambda$ is the wavelength of light emitted from laser 102; and n equals 2, 4, etc., depending on the number of passes the light makes through interferometer 108.

In the example system of FIG. 1, the movement of retroreflector 110 produces the Doppler shift and n is equal to 2. Laser 102 also outputs a reference signal at the reference frequency ($F_R$) via a fiber optic cable 111 that goes to a fiber optic receiver in the measurement and processing electronics 112. The reference signal is produced by mixing the two beams from laser 102 ($F_1$ and $F_2$), which is represented by the following Equation III:

$$\text{Reference Signal} = F_1 \otimes F_2 \qquad \text{Equation III}$$

Measurement and processing electronics 112 contain a fiber optic receiver that produces an electrical reference signal corresponding to the optical reference signal. The reference signal has a frequency that is equal to the reference frequency $F_R$.

Measurement and processing electronics 112 measure and accumulate the phase difference between the reference signal and the measurement signal, and process the difference to provide position and velocity outputs.

II. Non Linearity

In less than ideal situations, light leakage between beams from laser 102 occurs, causing a small amount of one frequency to be present in the other frequency. Symbolizing the ideal by a capital letter and leakage by a lower-case letter, the non-ideal situation can be symbolized by the following Equation IV and Equation V:

$$\text{Measurement Signal: } (\vec{F}_1 + \vec{f}_2) \otimes (F_2 + f_1) \qquad \text{Equation IV}$$

$$\text{Reference Signal: } (F_1 + f_2) \otimes (F_2 + f_1) \qquad \text{Equation V}$$

Through mixing, signals of many frequencies are produced. The measurement signal has six mixed components M1-M6, which are defined as follows:

M1: $\vec{F}_1 \otimes F_2$; M2: $\vec{F}_1 \otimes \vec{f}_2$; M3: $f_1 \otimes F_2$; M4: $f_1 \otimes \vec{F}_1$; M5: $\vec{f}_2 \otimes F_2$; M6: $f_1 \otimes \vec{f}_2$ The reference signal also has six mixed components R1-R6, which are defined as follows:

R1: $F_1 \otimes F_2$; R2: $F_1 \otimes f_2$; R3: $f_1 \otimes F_2$; R4: $f_1 \otimes F_1$; R5: $f_2 \otimes F_2$; R6: $f_1 \otimes f_2$ The signals M1 and R1 are the desired measurement and reference signals, respectively, not non-linearity. Typically, M1 and R1 are the dominant components.

The signals M6 and R6 are each mixing products of two typically small signals, producing only second-order effects. Signals M6 and R6 may be ignored.

The signals R2, R3, R4, and R5 are static parameters. The signals R2 and R3 have the same frequency as the ideal signal R1, which is the reference or split frequency. The combined effect of R2 and R3 is to cause an inconsequential constant phase shift to the reference signal. Signals R4 and R5 are "steady" signals mixing with themselves, resulting only in a static DC amplitude shift. A "steady" signal is a signal that is not Doppler shifted. In an AC-coupled circuit, R4 and R5 produce no effect, and may be ignored.

The signals M4 and M5 are a type non-linearity that is observed at high speed of the measurement object away from the light source. The mixing product of M4 has the form shown in the following Equation VI:

$$\cos 2\pi \left( F_1 t - \frac{p_1}{\lambda/4} \right) \otimes \cos 2\pi (F_1 t) \Rightarrow \cos 2\pi \left( \frac{p_1}{\lambda/4} \right) \qquad \text{Equation VI}$$

where:

$p_1$ is a position parameter; and $\lambda$ is the wavelength of light emitted from laser 102.

Similarly, the mixing product of M5 has the form shown in the following Equation VII:

$$\cos 2\pi \left( F_2 t - \frac{p_2}{\lambda/4} \right) \otimes \cos 2\pi (F_2 t) \Rightarrow \cos 2\pi \left( \frac{p_2}{\lambda/4} \right) \qquad \text{Equation VII}$$

where:

$p_2$ is a position parameter; and $\lambda$ is the wavelength of light emitted from laser 102.

The position-parameters $p_1$ and $p_2$ may have different origins, but are almost identically scaled due to $F_1$ being only a few megahertz from $F_2$ in a specific embodiment according to the present teachings. The temporal frequency of M4 and M5 is the same, and equals the Doppler frequency, $f_{Doppler} = F_R - F_M$. The M4 and M5 signals perturb the measurement signal, at $F_M - f_{Doppler}$, producing non-linearity at the temporal frequency of $2*F_M - F_R$. M4 and M5 type of non-linearity can be seen only when the measurement frequency nears half the reference frequency, which occurs when the object is moving rapidly (e.g., about 0.5 m/sec) within a small range of velocities away from the source. Unfortunately, neither the temporal nor spatial frequency of M4 and M5 type of non-linearity is invariant, making its compensation more complex. In addition to the position-data, the reference frequency is needed.

A specific embodiment according to the present teachings compensates non-linearity caused by the signals M2 and M3. Non-linearity caused by M2 and M3 is most obvious at moderate velocities (e.g., under about 50 mm/sec). M2 and M3 produce a signal at the reference frequency that perturbs the measurement signal, M1, to cause non-linearity. The temporal frequency of the non-linearity is the Doppler frequency, and therefore the spatial frequency of the non-linearity is invariant (it is always one period in $\lambda/4$ of the distance traveled). Non-linearity caused by M2 and M3 is periodic with the position data with a period of 1 UI, or 1 "fringe," representing $\lambda/4$ of the distance traveled. For a HeNe laser, $\lambda$ is 633 nanometers. The spatial frequency invariance property of M2 and M3 type of non-linearity facilitates compensation.

The non-linearity perturbation, $\Delta(p)$, (in UI) as a function of position, p, (also in UI), is shown in the following Equation VII:

$$\Delta(p) = \left(\frac{1}{2\pi}\right)\arctan\left[\frac{r\cos[2\pi(p-\theta)]}{1-r\sin[2\pi(p-\theta)]}\right] \quad \text{Equation VIII}$$

where:
r is the ratio of the magnitudes of the combined perturbing M2+M3 (vector sum) signal to that of the ideal signal M1; and
θ is a phase-offset between the non-linearity pattern and the position data fringe periodicity.

III. Non-Linearity Compensation

A. Overview of Compensation System

In a specific embodiment according to the present teachings, the measured position data output by the interferometer system 100 is processed, and two best-fit, quasi-static, non-linearity parameters are produced to compensate data in the near future. Continuing the process indefinitely, all data after an initial latency period are compensated. Non-linearity magnitude and phase parameters are determined on-the-fly from 320 consecutive position-data words, and are used to compensate the position-data words immediately following. A specific embodiment according to the present teachings is a completely digital process that continues in "leapfrog" fashion, compensating all future data using the periodically updated non-linearity parameters.

Figure 2:
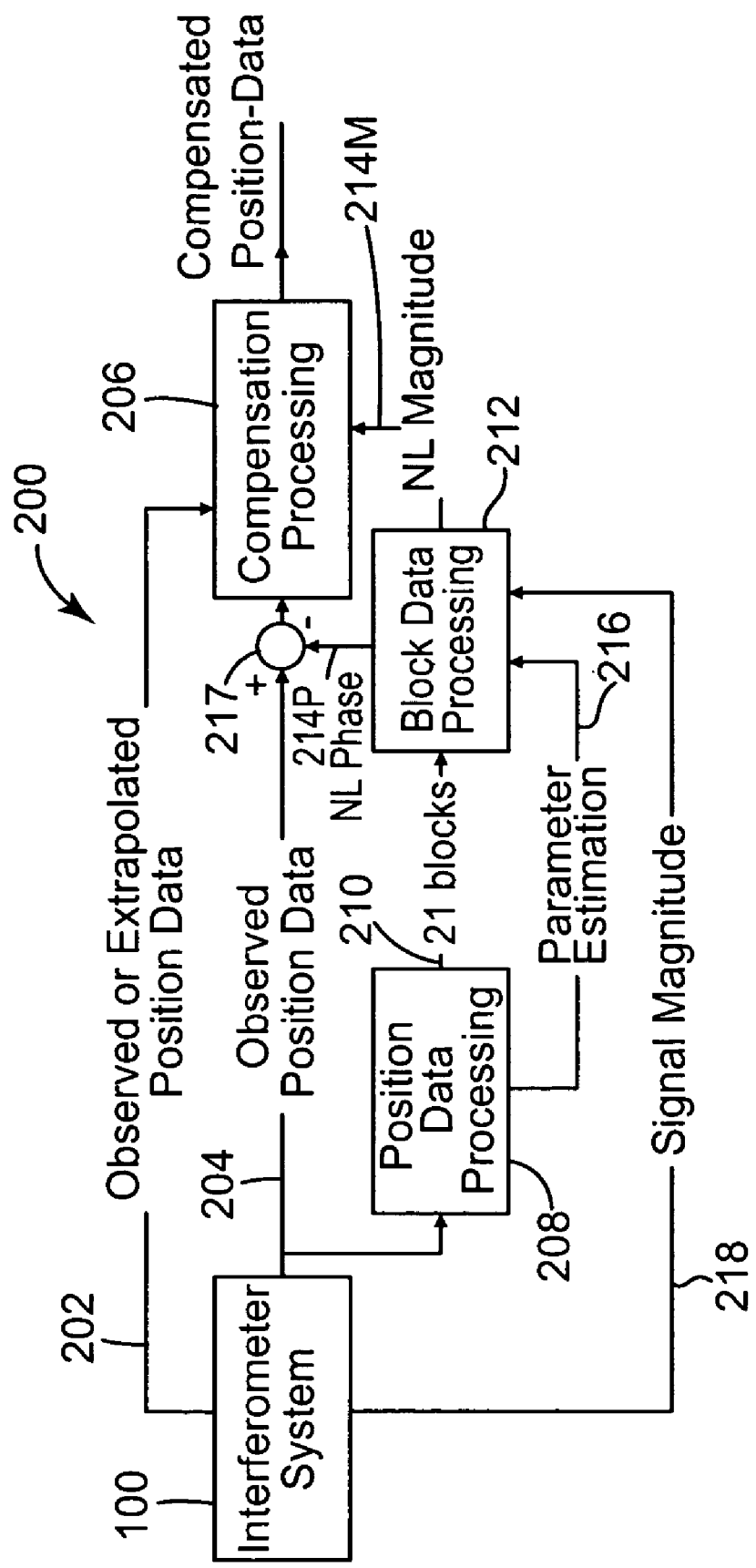
FIG. 2 is a functional block diagram illustrating a non-linearity compensation system in one embodiment according to the present teachings.

FIG. 2 is a functional block diagram illustrating a non-linearity compensation system 200 in one embodiment according to the present teachings. Non-linearity compensation system 200 includes compensation processing block 206, position data processing block 208, block data processing block 212 and arithmetic logic unit (ALU) 217. Non-linearity compensation system 200 compensates M2 and M3 type of non-linearity in extrapolated position data 202 and observed position data 204 output by interferometer system 100. Extrapolated position data 202 is provided to compensation processing block 206. Observed position data 204 are provided to position data processing block 208 and, after phase offset removal at ALU 217, address compensation processing block 206.

In a specific embodiment according to the present teachings, the functions performed by non-linearity compensation system 200 are limited to digital numerical computation by hardware, firmware, or a combination, and system 200 includes no optical or analog electrical circuitry. In a specific embodiment according to the present teachings, compensation system 200 is implemented using field programmable gate arrays (FPGAs) and/or one or more DSP processors.

Observed position-data 204, represented by p(j), output by interferometer system 100 at a 3.2 microsecond rate, is used by position data processing block 208 and block data processing block 212 to construct non-linearity parameters 214M and 214P (collectively referred to as non-linearity parameters 214). The "j" in p(j) is an index for identifying observed position-data words at a 3.2 microsecond rate. In the illustrated embodiment, non-linearity parameters 214 include a non-linearity (NL) magnitude parameter 214M ($V_{NL}$), and a NL phase parameter 214P ($\theta_{NL}$).

Non-linearity phase parameter 214P ($\theta_{NL}$) is subtracted from the observed position data 204 before addressing compensation processing block 206 continuously. Non-linearity magnitude parameter 214M ($V_{NL}$) is fed forward to synthesize the compensation processing block 206 to non-linearity compensate future, incoming data 202 at a higher, lower, or the same rate of 3.2 microseconds. Meanwhile, "future" uncompensated, observed position data 204 is used by position data processing block 208 and block data processing block 212 to generate yet further non-linearity parameters 214 to compensate for yet more future position data. After an initial latency period, all data will be compensated.

Since the non-linearity parameters 214M and 214P are quasi-static and continually updated, the process acts as a tracking filter, producing appropriate parameters 214 from recent position data 204. In a specific embodiment according to the present teachings, the compensation performed by compensation processing block 206 is at nanosecond speed.

In a specific embodiment according to the present teachings, position data processing block 208 detects when unfavorable conditions for accurate measurement occur (e.g., low velocity), and generates a parameter estimation signal 216. When a parameter estimation signal 216 is generated, block data processing block 212 begins estimating non-linearity parameters 214M based on a signal magnitude 218 provided by interferometer 100, as described in further detail below. During this time, position data is compensated by compensation processing block 206 using the existing non-linearity parameter 214P, and the estimated non-linearity parameters 214M. Updating of the non-linearity parameters 214M and 214P based on the position data continues when measurement conditions improve (e.g., when the velocity increases above a threshold value).

Figure 3:
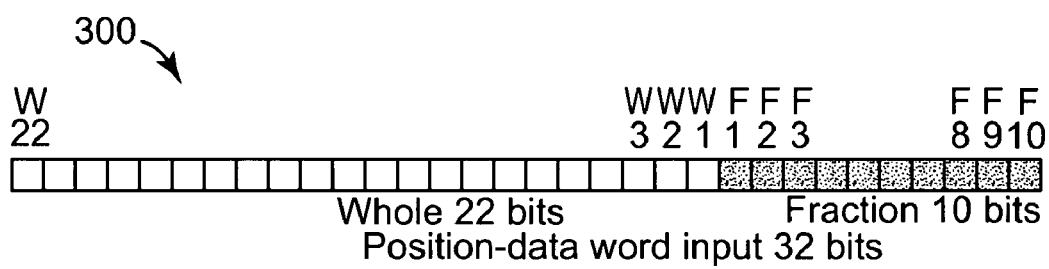
FIG. 3 is a diagram illustrating a position-data word output by the interferometer system of FIG. 1.

FIG. 3 is a diagram illustrating an observed position-data word 300 output by interferometer system 100. Position-data word 300 includes 32 bits. The most significant 22 bits (W1-22) of word 300 represent travel of multiples of one whole fringe of λ/4. The least significant 10 bits (F1-10) of word 300 represent the fractional portion of a fringe.

B. Position Data Processing

Figure 4:
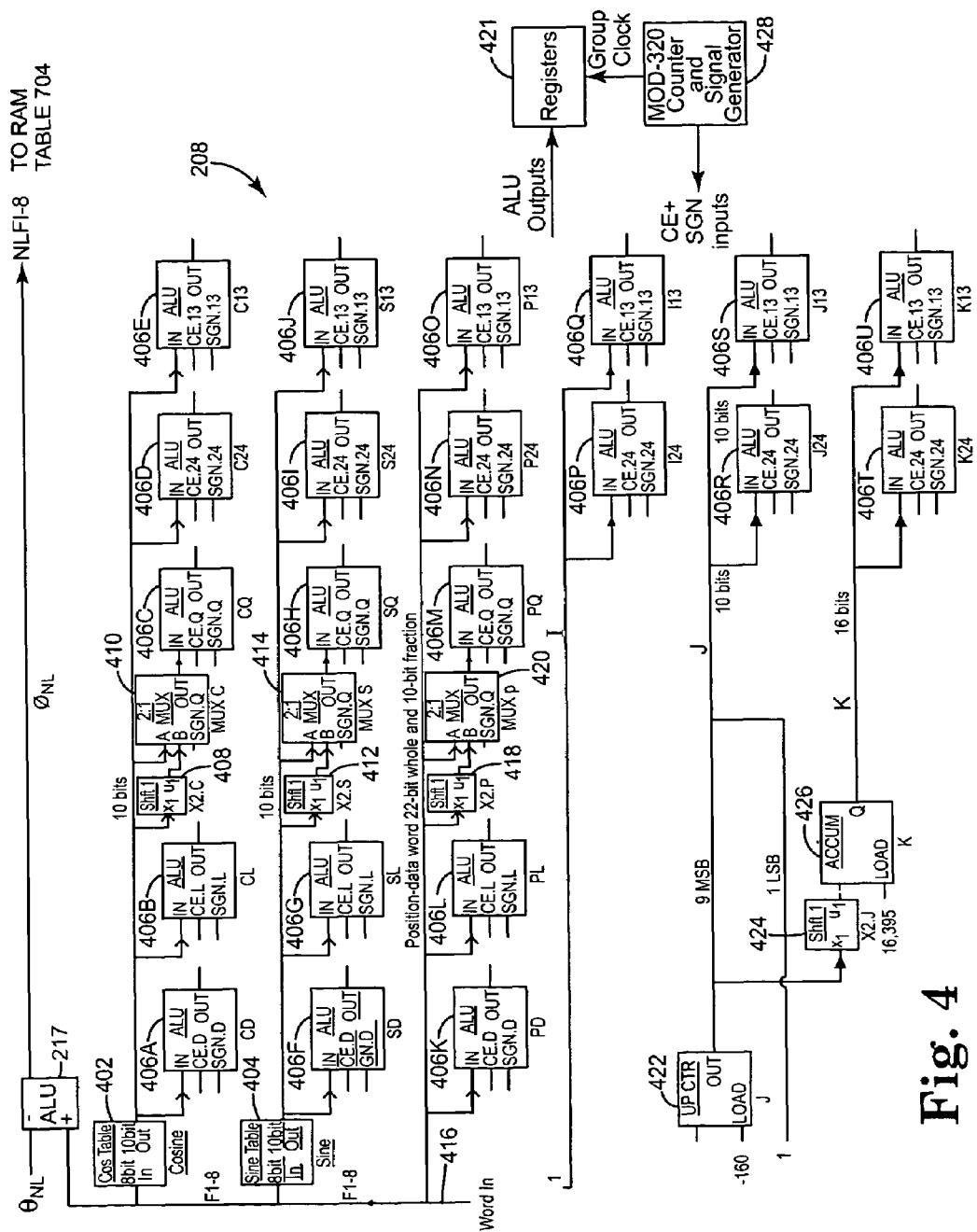
FIG. 4 is an electrical schematic diagram illustrating the position-data processing block shown in FIG. 2 in one embodiment according to the present teachings.

FIG. 4 is an electrical schematic diagram illustrating the position data processing block 208 shown in FIG. 2 in one embodiment according to the present teachings. Position data processing block 208 includes cosine lookup table 402, sine lookup table 404, arithmetic logic units (ALUs) 406A-406U (collectively referred to as ALUs 406), bit shifter 408, multiplexer 410, bit shifter 412, multiplexer 414, bit shifter 418, multiplexer 420, registers 421, up counter 422, bit shifter 424, accumulator 426, and modulo-320 counter and signal generator 428. In a specific embodiment according to the present teachings, the digital circuits shown in FIG. 4 are clocked synchronously at a 3.2 microsecond rate. The clocking circuit is omitted from FIG. 4 to simplify the illustration.

Observed position-data words 300, which are 32 bits wide, arrive at 3.2 microsecond intervals at "word in" terminal 416. In a specific embodiment according to the present teachings, position data processing block 208 processes the received position-data words 300 in groups of 320 words, and generates 21 output data blocks for each set of 320 position-data words 300.

Figure 5A:
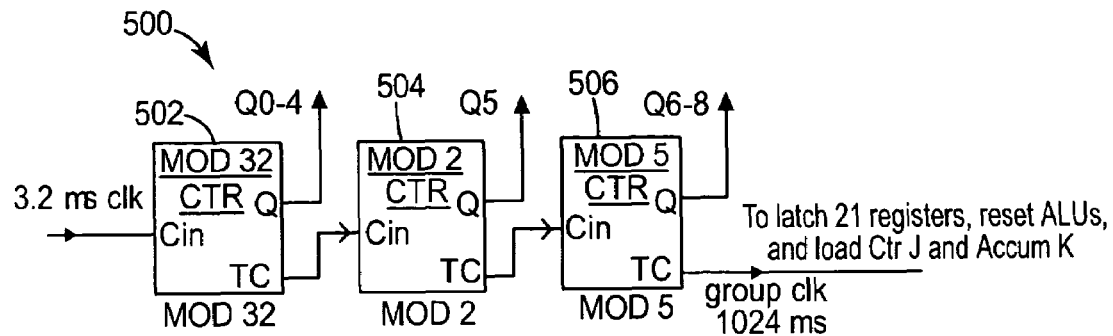
FIG. 5A is an electrical schematic diagram illustrating a modulo-320 counter for generating counter signals for controlling the operation of the position-data processing block shown in FIG. 4 in one embodiment according to the present teachings.
Figure 5B:
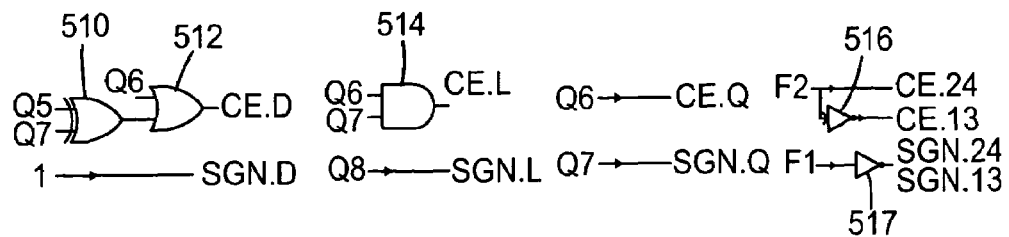
FIG. 5B is a diagram illustrating control signals for controlling the operation of the position-data processing block shown in FIG. 4 in one embodiment according to the present teachings.

Modulo-320 counter and signal generator 428 includes modulo-320 counter 500 (shown in FIG. 5A), and logic gates 510, 512, 514, 516 and 517 (shown in FIG. 5B). The processing performed by position data processing block 208 is scheduled by modulo-320 counter 500. Modulo-320 counter 500 comprises a cascade of three counters—modulo-32 counter 502, modulo-2 counter 504, and modulo-5 counter 506. Modulo-32 counter 502 and modulo-2 counter 504 are traditional binary up-counters. Modulo-5 counter 506 counts in a sequence 3-4-5-6-7-3-4-... etc.

The clock-in input (Cin) of modulo-32 counter 502 is coupled to a 3.2 microsecond clock signal. The terminal count (TC) output of modulo-32 counter 502 is coupled to the clock-in input of modulo-2 counter 504. The output (Q) of modulo-32 counter 502 is the 5 least significant bits (Q0-Q4) of the counter 500. The terminal count output of modulo-2 counter 504 is coupled to the clock-in input of modulo-5 counter 506. The output (Q) of modulo-2 counter 504 is the fourth most significant bit (Q5) of counter 500. The output (Q) of modulo-5 counter 506 is the three most significant bits (Q6-Q8) of counter 500.

A group clock signal is produced every 1024 microseconds at the terminal count of modulo-5 counter 506. The four most significant bits (Q5-Q8) of counter 500, and the most significant two bits (F1 and F2) of the fractional parts of the position-data words 300 are logically combined to generate 10 signals for controlling the 21 ALUs 406 as shown in the following Table I:

TABLE I

| Signal # | Name | Logical Combination |
|---|---|---|
| 1. | CE.D | Q6 + (Q5 ⊕ Q7) |
| 2. | SGN.D | 1 |
| 3. | CE.L | Q6 • Q7 |
| 4. | SGN.L | Q8 |
| 5. | CE.Q | Q6 |
| 6. | SGN.Q | Q7 |
| 7. | CE.24 | F2 |
| 8. | CE.13 | NOT(F2) |
| 9. | SGN.24 | NOT(F1) |
| 10. | SGN.13 | NOT(F1) |

In the above Table I, "+" indicates a logical OR operation, "⊕" indicates a logical EXCLUSIVE OR operation, and "•" indicates a logical AND operation.

FIG. 5B is a diagram illustrating the 10 control signals listed in Table I, and the logic gates for generating some of the signals. As shown in FIG. 5B, signal CE.D is generated by performing an EXCLUSIVE-OR operation on counter bits Q5 and Q7 with EXCLUSIVE-OR gate 510, and then performing a logical OR operation with OR gate 512 on counter bit Q6 and the output of EXCLUSIVE-OR gate 510. Signal SGN.D is a constant logical 1. Signal CE.L is generated by performing a logical AND operation on counter bits Q6 and Q7 with AND gate 514. Signal SGN.L is generated from counter bit Q8. Signal CE.Q is generated from counter bit Q6. Signal SGN.Q is generated from counter bit Q7. Signal CE.24 is generated from the second most significant fractional bit, F2, of position-data words 300. Signal CE.13 is generated by inverting with inverter 516 the second most significant fractional bit, F2, of position-data words 300. Signals SGN.24 and SGN.13 are generated from the complement of the most significant fractional bit, F1, of position-data words 300 through inverter 517 creating the complement.

Of the 10 signals shown in FIG. 5B, the SGN.x signals are coupled to corresponding SGN.x (polarity) inputs of ALUs 406, and the CE.x signals are coupled to corresponding CE.x (clock enable) inputs of ALUs 406, where "x" identifies the particular SGN and CE signals (e.g., D, L, Q, 13, or 24) that are coupled to a particular ALU 406. For example, as shown in FIG. 4, ALU 406A includes clock enable input CE.D, and polarity input SGN.D, indicating that signals CE.D and SGN.D, respectively, are coupled to these inputs of ALU 406A. The connection lines are not shown in FIG. 4 to simplify the illustration.

Figure 6:
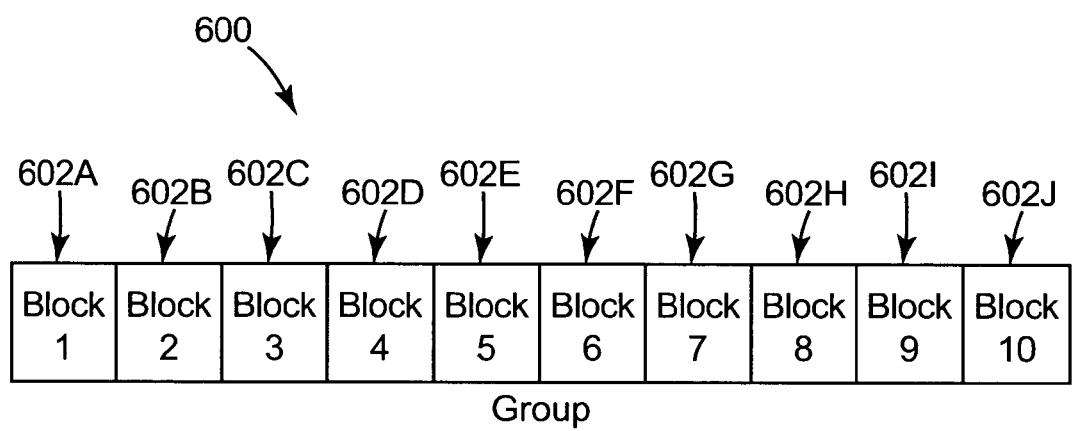
FIG. 6 is a diagram of a group of 320 position-data words partitioned into 10 blocks of 32 words each.

The counter arrangement 500 illustrated in FIG. 5A effectively partitions a group of 320 input words 300 into ten sequential blocks of 32 words each, numbered block 1 through block 10. FIG. 6 is a diagram of a group 600 of 320 position-data words 300, partitioned into 10 blocks 602A-602J (collectively referred to as blocks 602) of 32 words each.

A CE.x signal, when TRUE, enables corresponding ALUs 406. A SGN.x signal, when TRUE, dictates increment for an enabled ALU 406, and decrement when the signal is FALSE. The CE.x and SGN.x signals affect operation of ALUs 406 as shown in the following Table II:

TABLE II

| ALU's | Operation |
|---|---|
| 1. ALUs 406A (CD), 406F (SD), and 406K (PD) | D: increment in blocks 1, 2, 4, 5, 6, 7, 9, 10; disabled in blocks 3 and 8. |
| 2. ALUs 406B (CL), 406G (SL), and 406L (PL) | L: decrement in blocks 1, 2; disabled in blocks 3, 4, 5, 6, 7, 8; increment in blocks 9, 10. |
| 3. ALUs 406C (CQ), 406H (SQ), 406M (PQ) | Q: increment in blocks 1, 2, 9, 10; disabled in blocks 3, 4, 7, 8; decrement by twice the values in blocks 5, 6. |

As shown in the following Table III, regardless of the particular block 602 being processed, the following ALUs 406 operate only on the logical values of the most significant two fractional bits (F1, F2) of position-data words 300:

TABLE III

| ALU's | Operation |
|---|---|
| 1. ALUs 406D (C24), 406I (S24), 406N (P24), 406P (I24), 406R (J24), 406T (K24) | "24": increment on (0, 1); decrement on (1, 1); disabled on (0, 0) and (1, 0). |
| 2. ALUs 406E (C13), 406J (S13), 406O (P13), 406Q (I13), 406S (J13), 406U (K13) | "13": increment on (0, 0); decrement on (1, 0); disabled on (0, 1) and (1, 1). |

Position-data words 300 received on terminal 416, each 32-bits in width, are connected to the inputs of ALUs 406K (PD), 406L (PL), 406N (P24), and 406O (P13), bit shifter 418, and multiplexer 420. A second input (input B) of multiplexer 420 is the position-data word 300 multiplied by 2 through shifting by 1 bit with bit shifter 418. The multiplexed position-data output by multiplexer 420 is connected to ALU 406M (PQ). Multiplexer 420 is steered by the same control bit, SGN.Q, as ALU 406M (PQ). This arrangement results in the value of ALU 406M (PQ) being incremented by the position-data word 300 on TRUE SGN.Q, but decremented by twice the position data-word 300 on FALSE SGN.Q.

For summation purposes, the width of position-data words 300 can be reduced from 32 bits to 24 bits without penalty by subtracting a constant integer, such as the "whole" part of the last data word 300 from the last group 600, from each of the 320 subsequent position-data words 300.

The most significant 8 bits (F1-F8) of the fractional part of position-data words 300 received on terminal 416 address two look-up tables—cosine lookup table 402 and sine lookup table 404. Lookup tables 402 and 404 each span one complete period in the 8-bit address space. There are, therefore, 256 entries in each table 402 and 404 of one-period. Each entry in tables 402 and 404 is 10 bits wide.

The output of cosine table 402 is connected to the inputs of ALUs 406A (CD), 406B (CL), 406D (C24), and 406E (C13), bit shifter 408, and multiplexer 410. A second input (input B) of multiplexer 410 is the output of cosine table 402 multiplied by 2 through shifting by 1 bit with bit shifter 408. The multiplexed position-data output by multiplexer 410 is connected to ALU 406C (CQ). Multiplexer 410 is steered by the same control bit SGN.Q as ALU 406C (CQ). This arrangement results in the value of ALU 406C (CQ) being incremented by the output value of table 402 on TRUE SGN.Q, but decremented by twice the output value of table 402 on FALSE SGN.Q.

The output of sine table 404 is connected to the inputs of ALUs 406F (SD), 406G (SL), 406I (S24), and 406J (S13), bit shifter 412, and multiplexer 414. A second input (input B) of multiplexer 414 is the output of sine table 404 multiplied by 2 through shifting by 1 bit with bit shifter 412. The multiplexed position-data output by multiplexer 414 is connected to ALU 406H (SQ). Multiplexer 414 is steered by the same control bit SGN.Q as ALU 406H (SQ). This arrangement results in the value of ALU 406H (SQ) being incremented by the output value of table 404 on TRUE SGN.Q, but decremented by twice the output value of table 404 on FALSE SGN.Q.

In addition to processing position-data words 300, position data processing block 208 also synthesizes three 320 clock length (1024 microseconds) digital sequences I, J, and K. The digital sequences I, J, and K, are repeated once per group 600 of 320 position data words 300.

Sequence I is a constant logical 1, and is connected to the inputs of ALUs 406P (I24) and 406Q (I13). Sequence I is one bit wide. Therefore, ALUs 406P (I24) and 406Q (I13) could be simple counters in an alternative embodiment. Sequence I sums to $2^8$ under Operation D, and zero under operations L and Q.

Sequence J linearly progresses from −159.5 to +159.5 by +1 per step. Sequence J comprises 9 bits from up-counter 422 concatenated with 1 least significant bit of a constant logical 1. Sequence J is 10 bits wide and connects to the inputs of ALUs 406R (J24) and 406S (J13). Sequence J sums to $2^{14}$ under Operation L, and zero under operations D and Q.

Sequence K is quadratic, and numerically equals J²−9,045.25 at each step. Sequence K is 16 bits wide, and is connected to the inputs of ALUs 406T (K24) and 406U (K13). The value 9,045.25 equals (64·127·129−96·191·193+160·321·319)/(12·128), which ensures that K sums to zero when blocks 1, 2, 4, 5, 6, 7, 9, and 10, are summed. Sequence K is synthesized by loading 16,395 into accumulator 426 at the beginning of a new group 600 of position-data words 300, and accumulating (2·J−1) at each step, which is twice the value of counter 422 alone, that is, without the 1 concatenated least significant bit. J is multiplied by 2 through shifting J by 1 bit with bit shifter 424. Sequence K sums to $2^{21}$ under Operation Q, and zero under operations D and L.

The terminal count output of modulo-5 counter 506 generates a group clock signal every 1024 microseconds, which indicates the end of a group 600 of position-data words 300. The group clock signal from modulo-5 counter 506 is coupled to 21 registers 421. Each of the 21 registers 421 is also coupled to the output of one of the 21 ALUs 406. When the group clock signal is received by registers 421, all 21 outputs of the ALUs 406 are latched to the 21 registers 421. ALUs 406 are then reset to zero, and up-counter 422 and accumulator 426 are loaded with values 160 and 16,395, respectively. After being reset, ALUs 406 are once again receptive to new entries.

C. Generation of Non-Linearity Parameters (Magnitude $V_{NL}$ and Phase $\theta_{NL}$)

The 21 values latched by registers 421 from ALUs 406 are $I_{24}$, $J_{24}$, $K_{24}$, $C_{24}$, $S_{24}$, $P_{24}$, $I_{13}$, $J_{13}$, $K_{13}$, $C_{13}$, $S_{13}$, $P_{13}$, $P_D$, $P_L$, $P_Q$, $C_D$, $C_L$, $C_Q$, $S_D$, $S_L$, and $S_Q$, which are output by ALUs 406P, 406R, 406T, 406D, 406I, 406N, 406Q, 406S, 406U, 406E, 406J, 406O, 406K, 406L, 406M, 406A, 406B, 406C, 406F, 406G, and 406H, respectively. The 21 values are digitally processed by block data processing block 212 to produce the magnitude $V_{NL}$ and phase $\theta_{NL}$ of any non-linearity present in the signal using the mathematical procedure shown in the following Equations IX through XIX.

Six quantities, $P_{24}'$, $C_{24}'$, $S_{24}'$, $P_{13}'$, $C_{13}'$, and $S_{13}'$, are generated as shown in the following Equations IX through XIV:

$$P'_{24} = P_{24} - \frac{I_{24} \cdot P_D}{2^8} - \frac{J_{24} \cdot P_L}{2^{14}} - \frac{K_{24} \cdot P_Q}{2^{21}} \quad \text{Equation IX}$$

$$C'_{24} = C_{24} - \frac{I_{24} \cdot C_D}{2^8} - \frac{J_{24} \cdot C_L}{2^{14}} - \frac{K_{24} \cdot C_Q}{2^{21}} \quad \text{Equation X}$$

$$S'_{24} = S_{24} - \frac{I_{24} \cdot S_D}{2^8} - \frac{J_{24} \cdot S_L}{2^{14}} - \frac{K_{24} \cdot S_Q}{2^{21}} \quad \text{Equation XI}$$

$$P'_{13} = P_{13} - \frac{I_{13} \cdot P_D}{2^8} - \frac{J_{13} \cdot P_L}{2^{14}} - \frac{K_{13} \cdot P_Q}{2^{21}} \quad \text{Equation XII}$$

$$C'_{13} = C_{13} - \frac{I_{13} \cdot C_D}{2^8} - \frac{J_{13} \cdot C_L}{2^{14}} - \frac{K_{13} \cdot C_Q}{2^{21}} \quad \text{Equation XIII}$$

$$S'_{13} = S_{13} - \frac{I_{13} \cdot S_D}{2^8} - \frac{J_{13} \cdot S_L}{2^{14}} - \frac{K_{13} \cdot S_Q}{2^{21}} \quad \text{Equation XIV}$$

From the six quantities calculated in Equations IX through XIV, non-linearity parameters $V_{NL}$ and $\theta_{NL}$ are generated as shown in the following Equations XV through XIX:

$$\det = -C'_{24} \cdot S'_{13} + C'_{13} \cdot S'_{24} \quad \text{Equation XV}$$

$$A_{NL} = -S'_{13} P'_{24} + S'_{24} P'_{13} \quad \text{Equation XVI}$$

$$B_{NL} = C'_{13} P'_{24} - C'_{24} P'_{13} \quad \text{Equation XVII}$$

Non-linearity magnitude $\quad$ Equation XVIII
$$V_{NL} = (A_{NL}^2 + B_{NL}^2)^{1/2} / \det.$$

Non-linearity phase $\quad$ Equation XIX
$$\theta_{NL} = \operatorname{arctangent}(B_{NL}/A_{NL})/2\pi$$

Both the non-linearity magnitude $V_{NL}$ and phase $\theta_{NL}$ are expressed in UI, where one UI represents $\lambda/4$. The peak position-deviation from ideal is $V_{NL}$ and the location of the periodic pattern is given by the phase $\theta_{NL}$.

In a specific embodiment according to the present teachings, only fixed point computations are performed by compensation system 200, and division operations are limited to powers of 2. In a specific embodiment according to the present teachings, the process performed by compensation system 200 is implemented with either hardware or firmware, or a combination of hardware and firmware.

D. Non-Linearity Compensation Using Generated Parameters

The non-linearity pattern that is a subject of specific embodiments according to the present teachings is a result of single-side-band (SSB) modulation and is not a single sinusoid. Specifically, Δ(p), the phase deviation from ideal as a function of fractional position, p, is given in UI by the following Equation XX:

$$\Delta(p) = \left(\frac{1}{2\pi}\right) \arctan\left(\frac{r \cdot \cos[2\pi(p-\theta)]}{1 - r \cdot \sin[2\pi(p-\theta)]}\right) \quad \text{Equation XX}$$

where:
   r is the ratio of the perturbing signal magnitude to the ideal signal magnitude; and
   angle θ is a phase difference between the non-linearity periodicity Δ(p) and the position (fraction) periodicity p. The block regression process measures the phase offset as $\theta_{NL}$.

For small deviations, Δ(p) is well approximated by the following Equations XXI through XXIV:

$$\Delta p \approx \left(\frac{1}{2\pi}\right)\left(\frac{r \cdot \cos[2\pi(p-\theta)]}{1 - r \cdot \sin[2\pi(p-\theta)]}\right) \quad \text{Equation XXI}$$

$$\Delta p = \frac{\left(\frac{r}{2\pi}\right) \cdot \cos[2\pi(p-\theta)]}{1 - 2\pi \cdot \left(\frac{r}{2\pi}\right)\sin[2\pi(p-\theta)]} \quad \text{Equation XXII}$$

$$\Delta(p) \approx V_{NL} \cdot \cos 2\pi(p - \theta_{NL}) \cdot \quad \text{Equation XXIII}$$
$$[1 + 2\pi \cdot V_{NL}\sin 2\pi(p - \theta_{NL})]$$

$$\Delta p \approx V_{NL} \cdot \cos 2\pi(p - \theta_{NL}) + \quad \text{Equation XXIV}$$
$$\pi \cdot V_{NL}^2 \sin 4\pi(p - \theta_{NL})$$

The quantity r/2π in Equation XXII is measured as $V_{NL}$, the magnitude, in Equations XXIII and XXIV, and θ in Equation XXII appears as deviation phase, $\theta_{NL}$, in Equations XXIII and XXIV. Both quantities, $V_{NL}$ and $\theta_{NL}$, are determined in a specific embodiment according to the present teachings using the block regression method described above. The values of $V_{NL}$ and $\theta_{NL}$ are estimated accurately using only the cosine term. The sine term, being orthogonal at twice the frequency, need not be involved in the block regression estimation, but plays a part in determining the actual compensation value.

Even though the non-linearity parameters 214 (magnitude-$V_{NL}$, and phase-$\theta_{NL}$) are derived from measured position-data, p(j), that arrives at a rate of one position-data word 300 every 3.2 microseconds, they may be used to compensate position data at any rate for the next 1024 microseconds.

The following Equation XXV can be described as the phase deviation Δφ(j) at any time step j, as a function of the ideal non-linear phase φ(j):

$$\Delta\phi(j) \approx V_{NL} \cdot \cos 2\pi\phi(j) + \pi \cdot V_{NL}^2 \sin 4\pi\phi(j) \quad \text{Equation XXV}$$

where $V_{NL}$ is a measured non-linearity magnitude value.

Equation XXV shows the expected non-linearity phase deviation Δφ(j) given the ideal phase φ(j). The non-linearity phase value $\theta_{NL}$ is also a measured value. It is subtracted from the position data words to generate a non-linearity phase progression $\phi_{NL}(j)$. In practice, the ideal φ(j) is not available. But $\phi_{NL}(j)$ itself is subject to non-linearity perturbation and is different from the ideal φ(j) by an unknown amount Δφ(j) as shown in the following Equation XXVI:

$$\phi_{NL}(j) = \phi(j) + \Delta\phi(j) \quad \text{Equation XXVI}$$

The phase deviation $\Delta\phi_{NL}(j)$ based on the corrupted argument $\phi_{NL}(j)$ is:

$$\Delta\phi_{NL}(j) \approx V_{NL} \cdot \cos 2\pi\phi_{NL}(j) + \pi \cdot V_{NL}^2 \sin 4\pi\phi_{NL}(j) \quad \text{Equation XXVII}$$

This quantity in Equation XXVII, however, is not exactly the compensation needed as it is based on a corrupted argument.

Assuming changes are piecewise linear near the region between $\phi_{NL}(j)$ and φ(j), these two are also related as shown in the following Equation XXVII:

$$\Delta\phi(j) = \Delta\phi_{NL}(j) - \Delta\phi_{NL} \cdot \Delta\phi(j) \quad \text{Equation XXVIII}$$

The desired deviation Δφ(j) can be solved as:

$$\Delta\phi(j) = \frac{\Delta\phi_{NL}(j)}{1 + \Delta\phi_{NL}} = \frac{V_{NL} \cdot \cos[2\pi\phi_{NL}(j)] +}{1 - 2\pi\sin[2\pi\phi_{NL}(j)] +} \quad \text{Equation XXIX}$$
$$\frac{\pi \cdot V_{NL}^2 \sin[4\pi\phi_{NL}(j)]}{4\pi^2 \cos[4\pi^2 \cos[4\pi\phi_{NL}(j)]}$$

For small values of $V_{NL}$ (e.g., $V_{NL} << 1/2\pi$), making use of 1/(1−δ)≈1+δ, and dropping all terms involving $V_{NL}^3$ or higher, Δφ(j) may be simplified as shown in the following Equations XXX and XXXI:

$$\Delta\phi(j) \approx (V_{NL} \cdot \cos[2\pi\phi_{NL}(j)] + \pi \cdot V_{NL}^2 \sin[4\pi\phi_{NL}(j)]) \cdot (1 + 2\pi \sin[2\pi\phi_{NL}(j)]) \quad \text{Equation XXX}$$

$$\Delta\phi(\phi_{NL}) = V_{NL} \cdot \cos 2\pi\phi_{NL} + 2\pi \cdot V_{NL}^2 \cdot \sin 4\pi\phi_{NL} \quad \text{Equation XXXI}$$

Therefore, the desired phase deviation Δφ(j) may be constructed from the corrupted phase $\phi_{NL}(j)$ quite accurately up to the second harmonics by Equation XXXI.

In a specific embodiment according to the present teachings, Δφ is computed into a single read/write memory table 704 (shown in FIG. 7), having 256 entries spanning one period of the $\phi_{NL}$, and addressable by the 8 most significant fractional bits, NLF1-NLF8 of $\phi_{NL}$. Each entry in table 704 is 8 bits wide in accordance with equation XXXI.

Figure 7:
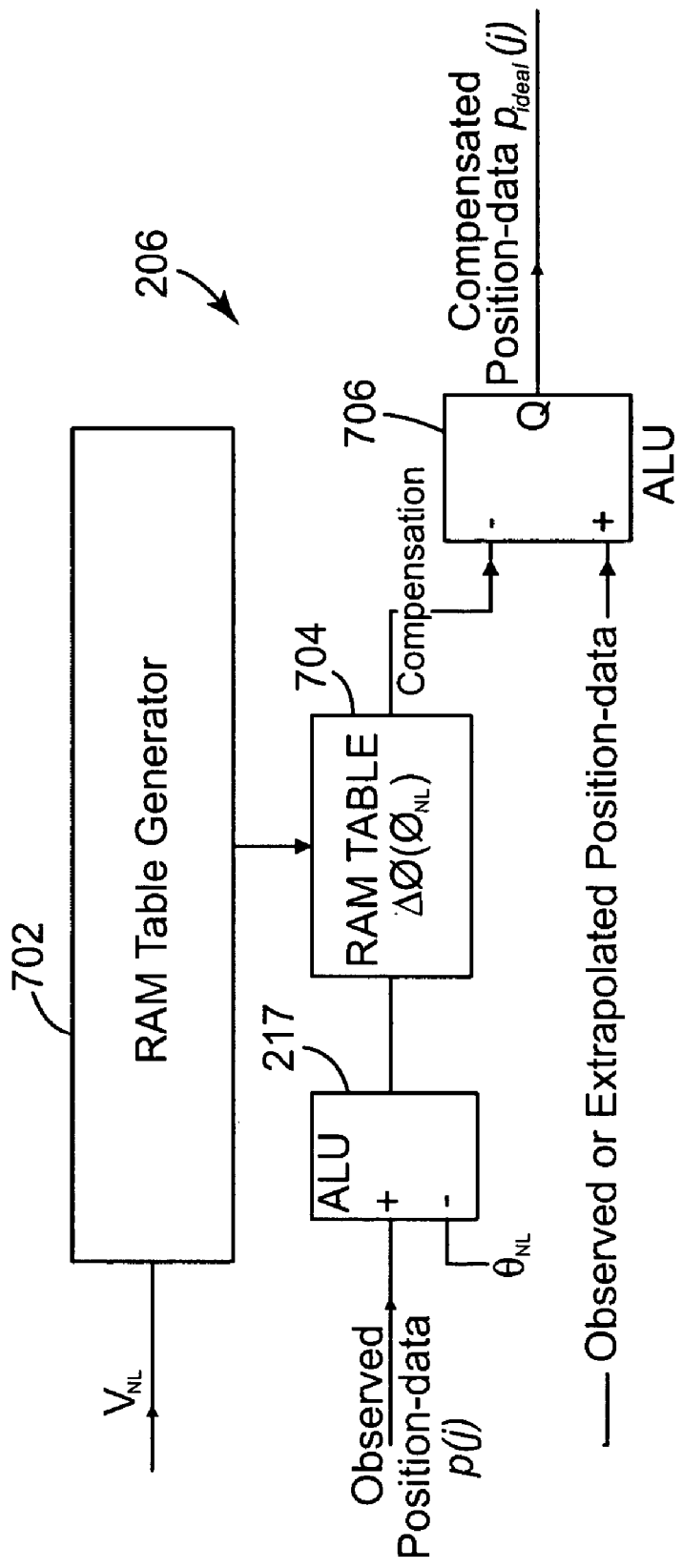
FIG. 7 is an electrical block diagram illustrating the compensation processing block shown in FIG. 2 in one embodiment according to the present teachings.

FIG. 7 is an electrical block diagram illustrating the compensation processing block 206 shown in FIG. 2 in one embodiment according to the present teachings. Compensation processing block 206 includes RAM table generator 702, RAM table 704, and ALU 706. In a specific embodiment according to the present teachings, RAM table 704 includes 256 values for Δφ, calculated from Equation XXXI, using fractional φ values that span one period. The various values for Δφ in RAM table 704 are represented by $\Delta\phi(\phi_{NL})$, where the relationship is as in Equation XXXI. RAM table 704 is generated by RAM table generator 702 based on non-linearity parameter, $V_{NL}$, provided by block data processing block 212. The other non-linearity parameter, $\theta_{NL}$, provided by block 212 is subtracted from current observed (fractional) position data words p(j) by ALU 217 to generate the non-linear phase progression $\phi_{NL}(j)$. RAM table generator 702 updates the Δφ(j) values stored in RAM table 704 each time a new value for $V_{NL}$ is received. As described above, $V_{NL}$ and $\theta_{NL}$ are calculated every 1024 microseconds (i.e., every 320 position-data words 300).

At any given time-index j, the (corrupted) phase $\phi_{NL}(j)$ will address the table 704. RAM table 704 is addressable by the 8 bits NLF1-NLF8 of the non-linear phase progression $\phi_{NL}(j)$. The Δφ values Δφ addressed by the non-linearity phase $\phi_{NL}(j)$ at a 3.2 microsecond rate are output by RAM table 704 to ALU 706. The value output by table 704 is precisely the compensation needed at the moment. ALU 706 subtracts the value output by table 704 from the current position-data word to get the compensated data word regardless of the rate of position-data words being compensated. ALU 706 subtracts the Δφ values received from RAM table 704 from received position data, including, in a specific embodiment, measured or observed position data and extrapolated position data.

The non-linearity progression $\phi_{NL}(j)$, which is derived from observed position data by subtracting an offset $\theta_{NL}$, determines the non-linearity present at any time, irrespective of the data rate of the uncompensated position data. The mathematical representation of the compensation process for extrapolated position data is shown in the following Equation XXXII:

$$p_{ideal}(i) = p(i) - V_{NL} \cdot \cos 2\pi\phi_{NL}(j) - 2\pi \cdot V_{NL}^2 \cdot \sin 4\pi\phi_{NL}(j) \quad \text{Equation XXXII}$$

where i stands for any data rate; and j stands for the observed data rate.

E. Non-Linearity Parameter Estimation for Low Velocities

In a specific embodiment according to the present teachings, the non-linearity compensation described above should have a minimum speed of about 0.5 mm/s, assuming a measurement window of 1 ms for 320 position data samples. The minimum speed can be decreased by lengthening the measurement window (i.e., slowing the sampling rate). There are occasions, however, that this measure cannot be conveniently taken far enough to accommodate extremely low speeds. For example, in some applications, the x-axis and z-axis, which are orthogonal to the scanning y-direction of a moving stage, ideally do not move at all. In practice, however, these axes do move due to non-ideal surfaces, residual roll, pitch and yaw. These incidental movements can be enough that nonlinearity measured at one location is not valid at another due to beam walk-off. If the speed is not sufficient to make new measurements, and old (and now inaccurate) non-linearity parameters are used to correct for new non-linearity, accuracy suffers.

In a specific embodiment according to the present teachings, when the average velocity of the object being observed falls below a low velocity threshold value (e.g., 0.5 mm per second), the updating of the quasi-static non-linearity parameters 214 ($\theta_{VL}$ and $V_{NL}$) based on Equations XVIII and XIX is suspended, and block data processing block 212 (FIG. 2) begins updating the non-linearity magnitude parameter 214M ($V_{NL}$) based on the measured magnitude of the ideal measurement signal 218, and stops updating the non-linearity phase parameter 214P ($\theta_{NL}$). The measured measurement signal is defined in Equation I above, and is also referred to above as M1.

When a low velocity condition (e.g., less than 0.5 mm per second) is sensed by position data processing block 208 (FIG. 2), block 208 sends a parameter estimation signal 216 to data processing block 212, indicating to block 212 that the non-linearity magnitude parameter 214M ($V_{NL}$) is to be estimated. In a specific embodiment according to the present teachings, the test for the absence of the low velocity condition is: (1) The group 600 of 320 position data words 300 must have at least 8 "quadrant" transitions within 1024 microseconds; and (2) the group 600 of 320 position data words 300 must not dwell on any one quadrant for more than 128 microseconds.

A "quadrant" is defined by the most significant two bits (F1 and F2) of the fractional part of position data words 300 as shown in the following Table IV:

TABLE IV

| (F1, F2) | Name |
|---|---|
| 0, 0 | 1st quadrant |
| 0, 1 | 2nd quadrant |
| 1, 0 | 3rd quadrant |
| 1, 1 | 4th quadrant |

The non-linearity parameters 214 ($\theta_{VL}$ and $V_{NL}$) are updated based on Equations XVIII and XIX when one or both of the above two tests are satisfied. If neither test is satisfied, updating of the non-linearity phase parameter 214P ($\theta_{NL}$) is suspended, and block data processing block 212 updates the non-linearity magnitude parameter 214M ($V_{NL}$) based on the measured magnitude of the measurement signal 218 as described in further detail below. The non-linearity phase parameter value 214P ($\theta_{NL}$) calculated prior to suspension is held and used to compensate new position data in an uninterrupted manner. Updating of the non-linearity parameters 214 ($\theta_{NL}$ and $V_{NL}$) based on Equations XVIII and XIX resumes when either or both of the above two tests are satisfied.

During low velocity conditions, the non-linearity magnitude 214M ($V_{NL}$) is inversely proportional to the measured magnitude of the measurement signal ($\vec{F}_1 \otimes F_2$), as will now be described in further detail. As mentioned above, in less than ideal situations, light leakage between beams from laser 102 occurs, causing a small amount of one frequency to be present in the other frequency. Through mixing, signals of many frequencies are produced. The measurement signal has six mixed components M1-M6.

M1 is the ideal or desired measurement signal $\vec{F}_1 \otimes F_2$, and has a magnitude 218 represented by V. The light paths of the two signals are different, one being Doppler shifted and one not. Due to beam walk-off, or beam-shear, the magnitude V may fluctuate. The frequency of M1 also fluctuates in accordance with the Doppler shift. In practice, the perturbing signals M2-M6 are small in comparison to M1 and manifest themselves as small time-varying fluctuations of M1. A regression-based measurement averages out these perturbations and produces a measured magnitude that is a good estimate of the ideal magnitude of M1.

M2 is a perturbing signal caused by mixing $\vec{F}_1 \otimes \vec{f}_2$ (i.e., the signal $F_1$ mixing with its own contaminant $f_2$ within the same beam). Since both components are Doppler shifted together, their difference in frequency is constant, producing a constant frequency equaling the split frequency. Since there is no beam walk-off, the signal M2 is constant—both in magnitude and frequency.

M3 ($f_1 \otimes F_2$) is similar to M2. For M3, the signal $F_2$ is mixed with its own contaminant $f_1$ within the same beam, and therefore there is no beam walk-off. The magnitude and frequency of M3 are both constant.

M4 and M5 are seen only at high velocities. M6 is a second order phenomenon that may be ignored.

The non-linearity magnitude 214M ($V_{NL}$) is the ratio of the vector sum magnitude |M2+M3| divided by ($2\pi V$) in UI, where V is the magnitude 218 of the desired or ideal measurement signal $\vec{F}_1 \otimes F_2$. Since neither of the perturbing signals M2 and M3 changes in magnitude, the non-linearity magnitude 214M ($V_{NL}$) is inversely proportional to the ideal signal magnitude V. The perturbing signals M2 and M3 come from mixing the leakage with the main signal within the same light beams respectively, are not a function of beam walk-off, and, therefore, can be assumed to be constant. The strength of the ideal signal V, however, is subject to beam walk-off due to non-ideal alignment. Typically, the ideal signal V is large but fluctuating, and M2 and M3 are small in comparison and are relatively constant.

In light of the reciprocal relationship between the non-linearity magnitude 214M ($V_{NL}$) and the ideal signal magnitude V, new effective $V_{NL}$ parameters can be generated even though a new $V_{NL}$ measurement based on Equation XVIII may not be accurate due to insufficient velocity. In a specific embodiment according to the present teachings, an estimate of the ideal signal magnitude V is continuously measured by interferometer system 100, and an updated value for the measured signal magnitude V is provided to data processing block 212 every 3.2 microseconds, as indicated at 218 in FIG. 2. In a specific embodiment, the ideal signal magnitude V is continually measured by interferometer system 100 with phase measurement electronics, such as the phase digitizer disclosed in U.S. Pat. No. 6,480,126 B1, filed Oct. 26, 2001, issued Nov. 12, 2002, and entitled PHASE DIGITIZER, which is incorporated by reference. In a specific embodiment, the signal magnitude V is continually measured by interferometer system 100 based on Equations XVII-XX in U.S. Pat. No. 6,480,126.

When block 212 receives a parameter estimation signal 216 from block 208, block 212 records the measured signal magnitude $V=V_0$ at the time the last non-linearity magnitude $V_{NL}=V_{NL0}$ was calculated. Block 212 then begins estimating current or updated non-linearity magnitude parameters $V_{NL}$ based on the reciprocal relationship between the non-linearity magnitude $V_{NL}$ and the current measured ideal signal magnitude V as shown in the following Equation XXXIII:

$$V_{NL} = V_{NL0}\left(\frac{V_0}{V}\right)$$ Equation XXXIII

In a specific embodiment according to the present teachings, as long as the velocity remains at or below the low velocity threshold, block 212 estimates non-linearity magnitude parameters 214M ($V_{NL}$) based on Equation XXXIII, and the non-linearity phase parameter 214P ($\theta_{NL}$) is not updated. When the velocity rises above the low velocity threshold, block 212 resumes updating of the non-linearity parameters 214 ($V_{NL}$ and $\theta_{NL}$) based on Equations XVIII and XIX.

In some metrology systems, when the velocity is high, a tracking filter eliminates the perturbing effect of the leakage signal, and there is no significant non-linearity present in the data. A specific embodiment according to the present teachings bypasses the compensation process during such high velocity conditions. In a specific embodiment, the value of $P_L$ from ALU 406L, which is a direct indicator of velocity, is used to deactivate compensation when $P_L$ exceeds a threshold value commensurate with the metrology system non-linearity cut-off.

Specific embodiments according to the present teachings are applicable to either homodyne or heterodyne interferometers. In a specific embodiment, the interferometer itself is not modified in any way. Rather, the resulting measurement data output by the interferometer is processed, and two best-fit quasi-static non-linearity parameters are produced to compensate data in the near future. Continuing the process indefinitely, all data after an initial latency period are compensated. Specific embodiments according to the present teachings involve only digital numerical computation by hardware, firmware, or a combination. In a specific embodiment according to the present teachings, no optical or analog electrical circuitry is used. No Fourier transformation or other spectral analysis methods are employed in a specific embodiment.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for non-linearity compensating interferometer position data generated from a measurement signal, the method comprising:

generating a first set of non-linearity parameters based on received digital position values; sensing whether a low velocity condition exists;

updating a first one of the non-linearity parameters based on a measured magnitude of the measurement signal when the low velocity condition exists; and compensating at least on digital position value based on the updated non-linearity paramber when the low velocity condition exists.

2. The method of claim 1, wherein the measured magnitude represents an estimate of an ideal value of the measurement signal without non-linearity.

3. The method of claim 1, wherein the first one of the non-linearity parameters is updated by multiplying a previously generated non-linearity parameter by a previously measured magnitude of the measurement signal divided by a currently measured magnitude of the measurement signal.

4. The method of claim 1, wherein the first set of non-linearity parameters includes a non-linearity magnitude parameter and a non-linearity phase parameter.

5. The method of claim 4, wherein the first one of the non-linearity parameters is a non-linearity magnitude parameter.

6. The method of claim 5, wherein the non-linearity phase parameter is not updated when the low velocity condition exists.

7. The method of claim 1, wherein the low velocity condition represents an object movement of less than about 0.5 millimeters per second.

8. The method of claim 1, and further comprising: updating the first set of non-linearity parameters based on received digital position values if the low velocity condition does not exist; and compensating at least one digital position value based on the updated non-linearity parameters if the low velocity condition does not exist.

9. The method of claim 8, wherein the step of updating the first set of non-linearity parameters comprises: digitally processing a first group of digital position values to generate a plurality of data values; and digitally processing the plurality of data values to generate the updated non-linearity parameters for compensating a second group of digital position values.

10. The method of claim 9, wherein the updated non-linearity parameters are generated based on a block regression technique.

11. The method of claim 1, wherein the first set of non-linearity parameters is a set of quasi-static non-linearity parameters.

12. The method of claim 1, wherein a temporal frequency of the non-linearity being compensated is a Doppler frequency.

13. A compensation system for compensating interferometer position data, the system comprising:

an input for receiving a plurality of groups of digital position values, each digital position value including a whole number portion and a fractional number portion;

a parameter generator for generating a first set of non-linearity parameters based on the received digital position values when a low velocity condition does not exist, and for generating a second set of non-linearity parameters based on a measured magnitude of a measurement signal when the low velocity condition exists; and a digital compensator for compensating digital position values based on the generated non-linearity parameters.

14. The compensation system of claim 13, wherein the parameter generator comprises:

a digital position-data processor for digitally processing a first group of the digital position values and generating a plurality of data values;

a digital data value processor for processing the plurality of data values and generating the first set of non-linearity parameters; and wherein the digital compensator compensates a second group of the digital position values based on the first set of non-linearity parameters.

15. The compensation system of claim 14, wherein the digital position-data processor comprises:

a cosine look-up table coupled to the input for providing cosine values corresponding to the fractional portion of received digital position values;

a sine look-up table coupled to the input for providing sine values corresponding to the fractional portion of received digital position values;

a first plurality of arithmetic logic units (ALUs) for arithmetically processing the cosine values and the sine values, each ALU in the first plurality configured to output one of the plurality of data values based on the arithmetic processing; and a second plurality of ALUs coupled to the input for arithmetically processing the digital position values in the first group, each ALU in the second plurality configured to output one of the plurality of data values based on the arithmetic processing.

16. The compensation system of claim 13, wherein the measured magnitude represents an ideal value of the measurement signal.

17. The compensation system of claim 13, wherein the second set of non-linearity parameters is generated by multiplying previously generated non-linearity parameters by a previously measured magnitude of the measurement signal divided by a currently measured magnitude of the measurement signal.

18. The compensation system of claim 13, wherein the first set of non-linearity parameters includes a non-linearity magnitude parameter and a non-linearity phase parameter.

19. The compensation system of claim 18, wherein the second set of non-linearity parameters includes non-linearity magnitude parameters, and wherein new non-linearity phase parameters are not generated when the low velocity condition exists.

20. The compensation system of claim 13, wherein the low velocity condition represents an object movement of less than about 0.5 millimeters per second.

21. The compensation system of claim 13, wherein the first set of non-linearity parameters is generated based on a block regression technique.

22. The compensation system of claim 13, wherein the first set of non-linearity parameters is a set of quasi-static non-linearity parameters.

23. The compensation system of claim 13, wherein a temporal frequency of the non-linearity being compensated is a Doppler frequency.

24. A displacement measuring interferometer system comprising:

a light source for generating at least one light beam;

an interferometer for generating an optical measurement signal based on the at least one light beam;

a controller for generating a plurality of groups of digital position values based on the measurement signal; and at least one digital signal processor coupled to the controller for generating non-linearity parameters based on the digital position values for velocities above a threshold velocity, and for generating non-linearity parameters based on a magnitude of the measurement signal for velocities below the threshold velocity.

25. The interferometer system of claim 24, wherein the at least one digital signal processor is configured to compensate digital position values based on the generated non-linearity parameters.

26. The interferometer system of claim 24, wherein, for velocities above the threshold velocity, the at least one digital signal processor is configured to digitally process each group of the digital position values and generate a plurality of data values for each processed group, and digitally process the plurality of data values for each processed group to generate at least one non-linearity parameter for each processed group.

27. The interferometer system of claim 24, wherein the magnitude of the measurement signal is a measured magnitude representing an ideal magnitude value of the measurement signal.

28. The interferometer system of claim 24, wherein the at least one digital signal processor is configured to generate the non-linearity parameters based on the magnitude of the measurement signal by multiplying previously generated non-linearity parameters by a previously calculated magnitude of the measurement signal divided by a currently calculated magnitude of the measurement signal.

29. The interferometer system of claim 24, wherein the threshold velocity is about 0.5 millimeters per second.

* * * * *